US008785539B2

(12) United States Patent
McDonnell et al.

(10) Patent No.: US 8,785,539 B2
(45) Date of Patent: Jul. 22, 2014

(54) SILICEOUS-BASED POLYUREA COMPOSITIONS

(75) Inventors: Shane Oliver McDonnell, Lyons (FR); Christian Trieflinger, Burgkirchen (DE); Werner Temme, Bietingen (DE); Grzegorz Gomulka, Rheinfelden (DE); Michael Melchart, Traunstein (DE); Burkhard Walther, Garching (DE)

(73) Assignee: Construction Research & Technology GmbH, Trostberg (DE)

( * ) Notice: Subject to any disclaimer, the term of this patent is extended or adjusted under 35 U.S.C. 154(b) by 263 days.

(21) Appl. No.: 13/387,512

(22) PCT Filed: Jul. 7, 2010

(86) PCT No.: PCT/EP2010/059733
§ 371 (c)(1),
(2), (4) Date: Apr. 4, 2012

(87) PCT Pub. No.: WO2011/012415
PCT Pub. Date: Feb. 3, 2011

(65) Prior Publication Data
US 2012/0190792 A1 Jul. 26, 2012

(30) Foreign Application Priority Data
Jul. 30, 2009 (EP) ..................... 09166854

(51) Int. Cl.
*C08K 3/34* (2006.01)
(52) U.S. Cl.
USPC ........... 524/444; 524/447; 524/590; 524/591; 524/789; 524/839
(58) Field of Classification Search
USPC .................. 524/839, 444, 447, 590
See application file for complete search history.

(56) References Cited

U.S. PATENT DOCUMENTS

| 3,607,794 A | 9/1971 | Abbotson et al. |
| 3,941,855 A | 3/1976 | Ehrhard |
| 3,983,081 A | 9/1976 | Dieterich et al. |
| 4,129,696 A | 12/1978 | Markusch et al. |
| 5,039,711 A | 8/1991 | Blount |

FOREIGN PATENT DOCUMENTS

| DE | 2 227 147 A1 | 2/1974 |
| DE | 2 310 559 A1 | 10/1974 |
| DE | 25 42 279 A1 | 4/1977 |
| GB | 1 385 605 A | 2/1975 |
| GB | 1 450 240 A | 9/1976 |
| GB | 1 483 270 A | 8/1977 |
| GB | 1 554 857 A | 10/1979 |

OTHER PUBLICATIONS

PCT/EP2010/059733—International Preliminary Report on Patentability, Jun. 14, 2011.
PCT/EP2010/059733—International Search Report, Sep. 1, 2010.

*Primary Examiner* — Edward Cain
(74) *Attorney, Agent, or Firm* — Curatolo Sidoti Co., LPA; Joseph G. Curatolo; Salvatore A. Sidoti

(57) ABSTRACT

The present invention provides siliceous-based polyurea compositions, obtainable by reacting isocyanates, alkali silicates and hydratable aluminosilicates. Moreover, the present invention provides a process for the manufacture of these compositions, comprising the steps of mixing a hydratable aluminosilicate with an aqueous silicate and reacting this mixture with a polyisocyanate and/or a polyisocyanate prepolymer, optionally in the presence of a polyol and/or with the inclusion of an inert filler. Finally, the present invention provides the use of these compositions in the fields of aviation, automotive assemblies, construction, consumer products, fire protection, furniture components, insulation, shipbuilding and/or windmill construction. The compositions obtainable according to the present invention are lightweight, high load bearing, flame retarding materials.

13 Claims, No Drawings

SILICEOUS-BASED POLYUREA COMPOSITIONS

CROSS REFERENCE TO RELATED APPLICATIONS

This application is a national stage application of International Application No. PCT/EP2010/059733, filed 7 Jul. 2010, which claims priority from European Patent Application Serial No. 09166854.1, filed 30 Jul. 2009, from which applications priority is claimed, and which are incorporated herein by reference.

The present invention relates to siliceous-based polyurea compositions, the process for their manufacture and their use in various areas. More particularly, the present invention relates to siliceous-based polyurea compositions, obtainable by reacting isocyanates, alkali silicates and hydratable aluminosilicates.

In polyurethane industry foaming is initiated by reacting a known quantity of water in the polyol component with a polyisocyanate. The liberated carbon dioxide causes the resin to expand. Approaches to improve the flame retardancy include addition of halogenated and/or phosphorus-containing additives as well as halogenated polyols. There are, however, environmental concerns regarding these ingredients.

Two-phase polyurea silicate systems (PUS) are known in the art. The mixing ratio of organic and inorganic components can determine which liquid forms the continuous phase. If an oil-in-water emulsion forms, the organic isocyanate component forms the discontinuous phase, and the material properties would be a reflection of the hardened inorganic component.

U.S. Pat. No. 3,607,794 discloses a process for the production of a silica-containing refractory product which consists essentially of a reaction between an aqueous solution of an alkali metal silicate and an organic polyisocyanate in the presence of an inert material selected from the group consisting of particulate materials, fibrous and mixtures thereof and in the absence of a preformed resin. The use of amine catalysts, foaming agents and foam stabilizing agents is recommended in that US patent publication.

An emulsion inversion generates materials with properties reflective of the continuous organic matrix, which are then more combustible. The isocyanate-containing resin hardens by reaction of —NCO with the basic aqueous solution, carbon dioxide is liberated from the resultant carbamic acid which then transfers to the aqueous phase and causes hydrated silica gel precipitation. In turn the liberated amine unit forms polyurea by reaction with isocyanate groups, while further condensation reactions cause silicon dioxide network formation. The homogeneity of the biphasic mixture can be improved by incorporating dispersing agents, wetting agents and emulgators.

Interpenetrating networks from ionic-modified polyisocyanates in combination with hydraulic binders such as fast setting cement, was an approach to improve the mechanical properties of waterglass-polyisocyanate hybrids. DE 23 10 559 A1 discloses and claims aerated concrete, obtainable by the reaction of a mixture of aqueous alkali silicate solution, organic polyisocyanate and water-binding additives. These additives are described as water cements, preferably fast setting cements, synthetic anhydrite, gypsum, quicklime, and the like. In the examples ionically modified polyisocyanates, emulsifiers, catalysts and foaming agents were used.

U.S. Pat. No. 4,129,696 describes a process for the production of inorganic-organic plastic composites and the resultant products. The process generally comprises a reaction of an aqueous alkali metal silicate solution with a liquid organic polyisocyanate having a viscosity at 25° C. of at least about 0.4 Pa·s, said reaction being conducted in the absence of inorganic water-binding fillers. It is recommended to use catalysts, foaming agents and emulsifying agents.

A method to provide lightweight foamed PUS hybrid materials derived from a sol-gel reaction is disclosed by combining waterglass-polyisocyanate hybrids, where interpenetrating networks are produced from ionic-modified polyisocyanates (GB 1,483,270, GB 1,385,605 and DE 22 27 147 A1). Lightweight materials were produced by this method using chlorofluorocarbon blowing agents. In the examples listed, elevated processing temperatures of >30° C., or slow (over 40 minutes) foam rise are reported.

In its broadest aspect, the problem underlying the present invention is to mitigate the above identified disadvantages of the prior art. In particular, materials with a reasonably wide spectrum and a good balance of properties are needed, especially lightweight, high mechanical load baring, flame retarding materials. Avoiding halogenated and/or phosphorous-containing additives, foam stabilizing agents, catalysts and/or foaming agents would be of further advantage.

Particularly in the area of refrigerator insulation, no flame protection on the basis of halogenated and/or phosphorous-containing additives is commonly used as these additives could migrate into the food storage compartment and post toxicological risks. Refrigerator insulation is therefore often composed of flammable materials and entails high flame loads. A practical need therefore existed in the art for halogen and/or phosphorous-free insulation materials with reduced flame loads and reduced flammability.

These and further problems, which will become apparent to an expert upon studying the present description and working the enclosed examples, are solved with the features of the independent claims. The dependent claims are directed to preferred embodiments.

The present invention pertains to siliceous-based polyurea compositions, which are obtainable by reacting ingredients comprising a) a polyisocyanate, b) an aqueous silicate, and c) a hydratable aluminosilicate. Preferably the reaction ingredients further comprise d) a polyol, and/or e) an inert filler.

The polyisocyanate according to the present invention is an aliphatic isocyanate, an aromatic isocyanate or a combined aliphatic/aromatic isocyanate, having an —NCO functionality of preferably ≥2.

Suitable polyisocyanates include tetramethylene diisocyanate, hexamethylene diisocyanate (HMDI), dodecamethylene diisocyanate, 3-isocyanatomethyl-3,5,5-trimethylcyclohexyl isocyanate, i.e. isophorone diisocyanate (IPDI), 4,4'-dicyclohexylmethane diisocyanate ($H_{12}$MDI), 1,4-cyclohexane diisocyanate (CHDI), 4,4'-diisocyanatodicyclohexyl-2,2-propane, p-phenylene diisocyanate, 2,4- and 2,6-toluene diisocyanate (TDI) or mixtures thereof, tolidine diisocyanate, 2,2'-, 2,4'- and 4,4'-diphenylmethane diisocyanate (MDI) or mixtures thereof, 1,2-naphthylene diisocyanate, xylylene diisocyanate, tetramethylxylene diisocyanate (TMXDI), and mixtures thereof.

Polyisocyanates containing heteroatoms in the moiety linking the isocyanate groups are also suitable, i.e. polyisocyanates containing urea groups, urethane groups, biuret groups, allophonate groups, uretidinedione groups, isocyanurate groups, imide groups, carbodiimide groups, uretonimine groups and the like.

It is particularly preferred to use polymeric polyisocyanates based upon diphenylmethane diisocyanate isomers (MDI), the so-called MDI-grades, and polymeric MDI (PMDI), having an —NCO functionality of preferably ≥2.

For the purpose of the present invention, suitable (polymeric) polyisocyanates should possess viscosities of less than 20 Pa·s, preferably less than 10 Pa·s. The —NCO content should be in the range 10-30% by weight.

The aqueous silicate according to the present invention is an alkali silicate or ammonium silicate, preferably ammonium, lithium, sodium or potassium waterglass, or combinations thereof, having a (silica) modulus as defined by its $SiO_2$:$M_2O$ molar ratio of 4.0-0.2, preferably 4.0-1.0, wherein M stands for a monovalent cation, and having a solids content of 10-70% by weight, preferably 30-55% by weight, and/or a silicate content, calculated as $SiO_2$, of 12-32% by weight, preferably 18-32% by weight. Sodium and potassium waterglass are particularly preferred. Waterglass-viscosities should be in the range of 0.2-1.0 Pa·s; higher viscosities should be lowered by the addition of appropriate aqueous alkali.

Suitable hydratable aluminosilicates are the dehydrated and/or dehydroxylated forms of hydrated aluminosilicates such as antigorite, chrysotile, lizardite; kaolinite, illite, smectite clay, montmorillonite, vermiculite, talc, palygorskite, pyrophyllite, biotite, muscovite, phlogopite, lepidolite, margarite, glauconite; chlorite; and zeolites. Preferred hydratable aluminosilicates are selected from the group consisting of dehydrated kaolinite, metakaolin, fly ash, pozzolanes, zeolites, and mixtures thereof. These materials do not possess cementitious properties. Metakaolin is particularly preferred. When dehydrated (100-200° C.), aluminosilicate minerals lose most of their physically bound water. At higher temperatures, dehydroxylation takes place, and the interlayer region of these minerals collapse. Kaolinite dehydroxylates between 500-800° C. to form metakaolin.

The polyol is a polyfunctional alcohol having an —OH functionality of preferably ≥2. Suitable polyols include, but are not limited to ethylene glycol, 1,2- und 1,3-propylene glycol, 2-methyl-1,3-propanediol, 1,2-, 1,3-, 1,4- and 2,3-butanediol, 1,6-hexanediol, 1,8-octanediol, neopentylglycol, cyclohexanedimethanol, cyclohexane-1,4-diol, 1,4-bis-hydroxymethylcyclohexane, 1,5-pentanediol, 3-methyl-1,5-pentanediol, 1,12-dodecanediol, diethylene glycol, triethylene glycol, tetraethylene glycol, pentaethylene glycol, dipropylene glycol, dibutylene glycol; glycerol, sorbitol, trimethylolpropane, 1,2,4-butanetriol, 1,2,6-hexanetriol, pentaerythritol (all of which are possible starting materials for polyisocyanate prepolymers having an —NCO functionality of >2); polyester polyols from aliphatic and/or aromatic sources such as polycaprolactones, adipates, terephthalate esters, polycarbonates; polyether polyols including polyethylene glycol, polypropylene glycol, polytetramethylene glycol. Also suitable are polyhydroxylated natural oils or their derivatives, such as castor oil.

It is preferred that at least a part of the polyisocyanate and the polyol are first reacted to form a polyisocyanate prepolymer. A polyisocyanate prepolymer is a polymeric isocyanate having an —NCO functionality of preferably ≥2. Polyisocyanate prepolymers are preferably synthesized from the above mentioned MDI-grades or PMDI.

As inert fillers there can be used the above mentioned hydrated aluminosilicates, ball clay, china clay, barytes, calcium carbonate such as calcite, mica, perlite, pumice, silica such as quartz, dolomite, wollastonite, alumina, iron oxides, non-water binding zeolites or mixtures thereof. However, any other inert fillers known in the art may be employed.

According to the present invention the mass percentages of ingredients may be varied within a broad range. The following percentages apply to polyisocyanates, aqueous silicates, hydratable aluminosilicates and inert fillers:

10-80% by weight polyisocyanate,
2-80% by weight aqueous silicate,
2-90% by weight hydratable aluminosilicate,
0-90% by weight inert filler.
Preferred percentages comprise:
20-65% by weight polyisocyanate,
5-55% by weight aqueous silicate,
5-20% by weight hydratable aluminosilicate,
0-40% by weight polyol,
0-40% by weight inert filler.

Particular embodiments of this invention involve exceptionally high strength/high load bearing materials. Other embodiments of this invention involve particularly lightweight foamed materials. If high amounts of aqueous silicates are used all of the carbon dioxide generated from the reaction of polyisocyanate with water tends to be used up by the silicate component for hydrated silica precipitation; the reaction mixture will thus not foam. On the other hand, when small amounts of aqueous silicates are used lightweight foamed materials are obtained.

The compositions of the present invention possess flame-retarding properties. Without wishing to be bound to any particular theory, it is believed that the (re)hydrated aluminosilicate component, upon contact with fire, releases water which contributes to flame extinguishing. It is thus a distinct advantage of the present invention that flame-retarding properties can be achieved without the use of prior art halogenated and/or phosphorus-containing additives.

Although usual additives such as foam stabilizing agents, wetting agents, dispersing agents, catalysts and/or foaming agents may be used in the compositions of the present invention, these additives can be preferably avoided.

The siliceous-based polyurea compositions of the present invention are generally prepared by following a staged mixing process, comprising the steps of mixing a hydratable aluminosilicate with an aqueous silicate and reacting this mixture with a polyisocyanate and/or a polyisocyanate prepolymer, optionally in the presence of a polyol and/or with the inclusion of an inert filler. The materials are then left to mature within suitable supporting containers. The reactions are generally carried out at room temperature, and sufficient heat is generated in-situ to cure the reaction contents. The process for the manufacture of the composition according to the present invention preferably further comprises slow pressure release of gas formed in the reaction of the polyisocyanate and/or polyisocyanate prepolymer with water, i.e. pressure-released controlled foaming.

The use of the siliceous-based polyurea compositions of the present invention pertains to the areas of aviation; automotive assemblies, examples include but are not limited to seating, dashboards, interior padding, steering wheels, door panels, storage surrounds and engine space components; construction, examples include but are not limited to sandwich structures, thermally insulating panels, load bearing roofing and flooring systems, bridge and road repair systems; consumer products, examples include but are not limited to stationary and mobile refrigerator units; fire protection, examples include but are not limited to flame sealing materials; furniture components, examples include but are not limited to mattresses and upholstery; and insulation, examples include but are not limited to building panels and exterior insulation finishing systems; shipbuilding and/or windmill construction, examples include but are not limited to high load bearing in-situ filling of double-walled construction elements.

The present invention will be further illustrated with reference to the following examples.

EXAMPLES

For material testing, machine set-up was according to DIN 196-1. Lupranat® MI (4,4'-diphenylmethane diisocyanate) was obtained from Elastogran GmbH, Desmophen® 3600 z (propylene glycol) was obtained from Bayer AG, Argical M 1000 (metakaolin) was obtained from AGS Mineraux, quartz sand (0.06 mm-0.3 mm) was obtained from Carlo Bernasconi AG, potassium waterglass K-45 M (silica modulus 1.0, solids content 40.5% by weight) and Betol® K 42 T (silica modulus 2.9, solids content 40.0% by weight) were obtained from Woellner GmbH, sodium waterglass Inocot Na-4830 (silica modulus 2.9, solids content 44.9% by weight) and potassium waterglass Inobond K-4250 (silica modulus 3.2, solids content 41.3% by weight) were obtained from van Baerle GmbH.

Prepolymer Synthesis

Prepolymer 1 was obtained by reacting 1000 g commercial grade 4,4'-diphenylmethane diisocyanate (Lupranat® MI) with 863 g commercial grade propylene glycol (Desmophen® 3600 z) having an OH value of 56.0 mg/g KOH. The obtained Prepolymer 1 had an —NCO content of 15.6% by weight and a viscosity at 24° C. of 709 mPa·s.

Example 1

| A-Component: | Metakaolin, Argical M 1000 | 24.0 g |
|---|---|---|
| | Quartz sand | 55.2 g |
| | Potassium waterglass, K-45 M | 28.0 g |
| B-Component: | Prepolymer 1 | 133.91 g |
| C-Component: | Sodium waterglass, Inocot Na-4830 | 86.88 g |

Components A and C were mixed for 30 seconds at 1000 rpm. Component B was added and mixed for 60 seconds at 600 rpm. The density after 7 days storage at room temperature in a Styropor® mould was 1.380 g/ml. The material passed B2 flame testing according to DIN 4102. A maximum flame height of 20 mm was recorded after 20 seconds.

Example 2

| A-Component: | Metakaolin, Argical M 1000 | 4.19 g |
|---|---|---|
| | Quartz sand | 4.41 g |
| | Potassium waterglass, Inobond K-4250 | 9.65 g |
| B-Component: | Prepolymer 1 | 209.24 g |
| C-Component: | Potassium waterglass, Inobond K-4250 | 132.19 g |

Components A and C were mixed at 900 rpm for 60 seconds. Component B was added and mixed for 60 seconds at 600 rpm. The material was poured into a mould, and after 3 days tensile, compressive and flexural strengths values of 1.7 N/mm², 9.4 N/mm² and 63.3 N/mm² respectively were recorded. During testing the 4·4·4 cm³ block demonstrated an exceptional response to compression as it was crushed to within 21% of its original height under a maximum pressure of 100 ton, yet it re-expanded to over 80% of its original height upon pressure release. During flexural strength measurement a 4·4·16 cm³ sample was deformed by 46% and once pressure was released the material returned to its original shape. The density after 7 days storage at room temperature in a Styropor® mould was 1.036 g/ml.

Example 3

| A-Component: | Metakaolin, Argical M 1000 | 16.78 g |
|---|---|---|
| | Quartz sand | 38.59 g |
| | Potassium waterglass, Inobond K-4250 | 19.63 g |
| B-Component: | Prepolymer 1 | 167.39 g |
| C-Component: | Potassium waterglass, Inobond K-4250 | 105.75 g |

Components A and C were mixed at 800 rpm for 60 seconds. Component B was added and mixed for 60 seconds at 600 rpm. The material was poured into a mould and allowed to set. The density after 7 days storage at room temperature in the Styropor® mould was 0.875 g/ml.

Example 4

| A-Component: | Metakaolin, Argical M 1000 | 13.43 g |
|---|---|---|
| | Quartz sand | 30.87 g |
| | Potassium waterglass, Inobond K-4250 | 15.70 g |
| B-Component: | Prepolymer 1 | 133.92 g |
| C-Component: | Potassium waterglass, Inobond K-4250 | 169.20 g |

Components A and C were mixed at 800 rpm for 60 seconds. Component B was added and mixed for 60 seconds at 600 rpm. The material was poured into a mould, and after 3 days tensile, compressive and flexural strengths values of 1.5 N/mm², 5.2 N/mm² and 62.5 N/mm² respectively were recorded. During testing the 4·4·4 cm³ block demonstrated an exceptional response to compression as it was crushed to within 23% of its original height under a maximum pressure of 100 ton, yet it re-expanded to over 80% of its original height upon pressure release. During flexural strength measurement a 4·4·16 cm³ sample was deformed by 48% and once pressure was released the material returned to its original shape. The density after 7 days storage at room temperature in a Styropor® mould was 0.987 g/ml. The material passed B2 flame testing according to DIN 4102. A maximum flame height of 30 mm was recorded after 20 seconds.

Example 5

| A-Component: | Metakaolin, Argical M 1000 | 46.98 g |
|---|---|---|
| | Quartz sand | 108.05 g |
| | Potassium waterglass, K-45 M | 54.97 g |
| B-Component: | Prepolymer 1 | 156.23 g |

The ingredients of component A were mixed at 1000 rpm for 60 seconds. Component B was added and mixed for 60 seconds at 600 rpm. The material was poured into a mould, and after 3 days the tensile strength was measured. A maximum tensile strength value of 3.2 N/mm², with 48% elongation, was recorded. The density after 7 days storage at room temperature in a Styropor® mould was 0.710 g/ml.

Example 6

| A-Component: | Metakaolin, Argical M 1000 | 44.74 g |
| --- | --- | --- |
| | Quartz sand | 102.91 g |
| | Potassium waterglass, Betol K42T | 52.35 g |
| B-Component: | Prepolymer 1 | 111.60 g |

The ingredients of component A were mixed at 1000 rpm for 60 seconds, added to component B and mixed for a further 60 seconds at 600 rpm. The material was poured into a mould, and after 3 days tensile, compressive and flexural strengths values of 1.7 N/mm$^2$, 6.6 N/mm$^2$ and 62.5 N/mm$^2$ respectively were recorded. During testing the 4·4·4 cm$^3$ block demonstrated an exceptional response to compression as it was crushed to within 29% of its original height under a maximum pressure of 100 ton, yet it re-expanded to over 80% of its original height upon pressure release. During flexural strength measurement a 4.4.16 cm$^3$ sample was deformed by 20%. The density after 7 days storage at room temperature in a Styropor® mould was 0.969 g/ml. The material passed B2 flame testing according to DIN 4102. A maximum flame height of 20 mm was recorded after 20 seconds.

Example 7

| A-Component: | Metakaolin, Argical M 1000 | 40.27 g |
| --- | --- | --- |
| | Quartz sand | 92.62 g |
| | Potassium waterglass, Betol K42T | 47.11 g |
| B-Component: | Prepolymer 1 | 133.92 g |

The ingredients of component A were mixed at 1000 rpm for 60 seconds, added to component B and mixed for a further 60 seconds at 600 rpm. The material was poured into a mould, and after 3 days tensile, compressive and flexural strengths values of 1.7 N/mm$^2$, 8.1 N/mm$^2$ and 66.5 N/mm$^2$ respectively were recorded. During testing the 4·4·4 cm$^3$ block demonstrated an exceptional response to compression as it was crushed to within 25% of its original height under a maximum pressure of 100 ton, yet it re-expanded to over 80% of its original height upon pressure release. During flexural strength measurement a 4·4·16 cm$^3$ sample was deformed by 25%, and once pressure was released the material returned to its original shape. The density after 7 days storage at room temperature in a Styropor® mould was 0.842 g/ml.

Example 8

| A-Component: | Metakaolin, Argical M 1000 | 35.85 g |
| --- | --- | --- |
| | Potassium waterglass, K-45 M | 11.30 g |
| B-Component: | Prepolymer 1 | 45.40 g |

The ingredients of component A mixed at 2000 rpm for 60 seconds, component B was added and mixed for 30 seconds at 1000 rpm, and placed in a 500 cm$^3$ container to allow for a controlled pressure release. 10 seconds after sealing the container foam rise began, and 20 seconds later a controlled pressure release from the container over a 10 second period provided a stable foamed material. The density after 7 days storage at room temperature in a Styropor® mould was 0.294 g/ml.

The invention claimed is:

1. A siliceous-based polyurea composition, obtained by reacting ingredients comprising
   a) a polyisocyanate,
   b) an aqueous silicate,
   c) a hydratable aluminosilicate selected from metakaolin, fly ash, or mixtures thereof,
   d) a polyol, and optionally
   e) an inert filler.

2. The composition of claim 1, the reaction ingredients comprising
   20-65% by weight polyisocyanate,
   5-55% by weight aqueous silicate,
   2-20% by weight hydratable aluminosilicate selected from metakaolin, fly ash, or mixtures thereof,
   up to 40% by weight polyol,
   0-40% by weight inert filler.

3. The composition of claim 1, wherein the polyisocyanate is an aliphatic isocyanate, an aromatic isocyanate or a combined aliphatic/aromatic isocyanate, having an —NCO functionality of ≥2.

4. The composition of claim 1, wherein the aqueous silicate is an alkali silicate or ammonium silicate, having a modulus as defined by its $SiO_2:M_2O$ molar ratio of 4.0-0.2, wherein M stands for a monovalent cation, and having a solids content of 10-70% by weight.

5. The composition of claim 1, wherein the polyol is a polyfunctional alcohol having an —OH functionality of ≥2.

6. The composition of claim 1, wherein at least a part of the polyisocyanate and polyol have been first reacted to form a polyisocyanate prepolymer having an —NCO functionality of ≥2.

7. The composition of claim 1, wherein no halogenated and/or phosphorous-containing additives are comprised by the reaction ingredients.

8. The composition of claim 1, wherein no foam stabilizing agents, catalysts and/or foaming agents are comprised by the reaction ingredients.

9. A process for the manufacture of the composition as defined in claim 1, comprising the steps of mixing a hydratable aluminosilicate selected from metakaolin, fly ash, or mixtures thereof with an aqueous silicate and reacting this mixture with a polyisocyanate and/or a polyisocyanate prepolymer, optionally in the presence of a polyol and/or with the inclusion of an inert filler.

10. The process of claim 9, further comprising controlled pressure release of gas formed in the reaction of the polyisocyanate and/or polyisocyanate prepolymer with water.

11. The composition of claim 4, wherein the aqueous silicate is an alkali silicate or ammonium silicate, having a modulus as defined by its $SiO_2:M_2O$ molar ratio of 4.0-1.0, wherein M stands for a monovalent cation.

12. The composition of claim 4, wherein the aqueous silicate is an alkali silicate or ammonium silicate, having a solids content of 30-55% by weight.

13. The composition of claim 1, wherein the aqueous silicate is ammonium, lithium, sodium or potassium waterglass.

* * * * *